US011727377B2

(12) United States Patent
Millius et al.

(10) Patent No.: US 11,727,377 B2
(45) Date of Patent: Aug. 15, 2023

(54) METHOD OF EXECUTING CONVENTIONAL PURCHASE TRANSACTIONS USING CRYPTOCURRENCY

(71) Applicant: Flowency, LLC, New York, NY (US)

(72) Inventors: Peter Millius, New York, NY (US); David M. Wilkie, Hilton Head, SC (US); Andrew John Phillipson, Smyrna, GA (US); Christopher Ian Patton, Marietta, GA (US)

(73) Assignee: Flowency, LLC, New York, NY (US)

( * ) Notice: Subject to any disclaimer, the term of this patent is extended or adjusted under 35 U.S.C. 154(b) by 0 days.

(21) Appl. No.: 17/826,412

(22) Filed: May 27, 2022

(65) Prior Publication Data

US 2022/0292477 A1     Sep. 15, 2022

Related U.S. Application Data

(62) Division of application No. 16/875,502, filed on May 15, 2020, now Pat. No. 11,348,081.

(60) Provisional application No. 62/848,253, filed on May 15, 2019.

(51) Int. Cl.
*G06Q 20/20* (2012.01)
*G06Q 20/32* (2012.01)
*G06Q 20/40* (2012.01)
*G06Q 20/06* (2012.01)

(52) U.S. Cl.
CPC ........... *G06Q 20/20* (2013.01); *G06Q 20/065* (2013.01); *G06Q 20/322* (2013.01); *G06Q 20/401* (2013.01)

(58) Field of Classification Search
CPC .... G06Q 20/20; G06Q 20/065; G06Q 20/322; G06Q 20/401; G06Q 20/204; G06Q 20/3274; G06Q 20/02; G06Q 2220/00
See application file for complete search history.

(56) References Cited

U.S. PATENT DOCUMENTS

| 10,108,938 | B1 * | 10/2018 | Brock | G06Q 20/3674 |
|---|---|---|---|---|
| 10,255,600 | B2 * | 4/2019 | Ronca | H04L 67/12 |
| 10,699,340 | B2 * | 6/2020 | Gordon, III | G06Q 20/389 |
| 11,037,110 | B1 * | 6/2021 | Kurani | G06Q 20/3829 |

(Continued)

*Primary Examiner* — A. Hunter Wilder
(74) *Attorney, Agent, or Firm* — Pryor Cashman LLP

(57) ABSTRACT

A method of using cryptocurrency to transact fiat currency purchases using conventional POS apparatus includes funding by a user of a cryptocurrency account that requires withdrawal transactions to be signed by both the user and a payment platform. Upon purchase initiation, a platform-issued authorization number is entered into a merchant's POS apparatus and transmitted to the platform. Upon verification of sufficient cryptocurrency, the platform transmits payment information to the user, and upon approval thereof by the user, the user transmits a user-signed cryptocurrency transaction to the platform, and the platform remits fiat currency to the merchant. As purchases continue during an aggregation period, each user-signed transaction is sufficient to fund the aggregated purchases. Upon termination of the aggregation period, the most recent user-signed transaction is executed to withdraw cryptocurrency from the user's account. The user can display the authorization number on a mobile device for scanning by the POS apparatus.

10 Claims, 3 Drawing Sheets

(56) References Cited

U.S. PATENT DOCUMENTS

| | | | |
|---|---|---|---|
| 2015/0170112 A1* | 6/2015 | DeCastro | G06Q 20/381 |
| | | | 705/39 |
| 2019/0139033 A1* | 5/2019 | Ricotta | G06Q 20/1085 |
| 2020/0126071 A1* | 4/2020 | Perry | H04L 63/18 |
| 2020/0394620 A1* | 12/2020 | Kim | G06Q 20/0658 |

* cited by examiner

METHOD OF EXECUTING CONVENTIONAL PURCHASE TRANSACTIONS USING CRYPTOCURRENCY

RELATED APPLICATIONS

This application is a divisional of U.S. Non-Provisional application Ser. No. 16/875,502, filed May 15, 2020, now allowed, which claims the benefit of U.S. Provisional Application No. 62/848,253, filed May 15, 2019, both of which are herein incorporated by reference in their entireties for all purposes.

FIELD OF THE INVENTION

The invention relates to cryptocurrencies, and more particularly, to methods of completing purchases using cryptocurrencies.

BACKGROUND OF THE INVENTION

For many individuals, cryptocurrencies have become an increasingly attractive alternative to conventional "fiat" currencies. Reasons vary, and include opportunities for currency speculation, financial anonymity, and a general mistrust of the fiscal policies of government entities, which some individuals perceive to be political entities that can be unduly influenced by expedient political motives rather than sound fiscal policy.

While cryptocurrencies can be readily purchased, held, and sold, in somewhat the same manner as stocks or bonds, individuals who hold cryptocurrency have few options for actually using it as a currency. In most cases, users hold funds in online "wallets" (which may be private or custodial), and exchange them for fiat currencies when they wish to use the stored value to make a purchase. As such, cryptocurrencies are similar to stocks or bonds, in that they must be liquidated before their value can be used.

There are some limited opportunities to use cryptocurrencies as actual currencies. For example, some retailers, mostly online retailers, will accept payment in selected cryptocurrencies. However, these represent a very small fraction of online retailers, and almost no in-person retailers. There are also many payment services that accept cryptocurrency for online payments. With most of these services, however, a normal blockchain (so called "on-chain") transaction is sent from the user to the payment service. The payment service then has the luxury of waiting for validation of the blockchain transaction, which can take minutes or even hours, before payment is made. Validation of the blockchain transaction ensures that the transaction is indeed irreversible, and is not an attempt to spend the same cryptocurrency twice (a "double-spend").

Furthermore, each on-chain cryptocurrency transaction normally incurs a network fee called a "miner" fee. For example, Bitcoin miner fees can be as much as $50 per transaction. Reversals and mistakes also require on-chain transactions and are therefore costly for the merchant and/or consumer.

Many individuals who invest in cryptocurrencies desire to use their cryptocurrency in the same manner as conventional fiat currency, for example when making retail purchases. However, in a retail point-of-sale (POS) setting the luxury of waiting for blockchain confirmations is not available. Both the consumer and the retailer expect and require that a transaction will be completed within roughly 30 seconds or less. Also, incurring a miner fee each time a retail transaction is completed could significantly increase the costs of the purchases, and could therefore be a strong disincentive to using cryptocurrency for retail transactions.

Additionally, a cashier needs to be able to reverse transactions without penalty, in the event the consumer has made a mistake, a product is returned, etc. Furthermore, in-person POS purchases (as compared to online purchases) typically require use of a merchant POS device, and such devices are configured for use either of fiat currency in cash, use of a physical debit or credit card, or scanning of a code displayed on a mobile device that is linked to a debit or credit card, for example via "Apple Pay" or "Google Pay." Such POS devices are not configured for processing of payments via cryptocurrencies.

What is needed, therefore, is a method for enabling cryptocurrencies to be readily and conveniently used for conventional purchases, including in-person point of sale purchases using conventional POS apparatus, without requiring blockchain transaction delays, without each transaction being subject to a separate blockchain transaction fee, and without incurring additional fees when a transaction is changed or reversed.

SUMMARY OF THE INVENTION

The present invention is a method for enabling cryptocurrencies to be readily and conveniently used for conventional purchases, including in-person point of sale purchases using conventional POS apparatus, without requiring blockchain transaction delays, without each transaction being subject to a separate blockchain transaction fee, and without necessarily incurring additional fees when a transaction is changed or reversed.

According to the present method, cryptocurrency purchases are mediated by a payment platform. A user opens an account with the payment platform that is linked to a cryptocurrency payment application ("app") running on a wireless mobile device possessed by the user. In embodiments, the wireless mobile device is a smartphone. At least one cryptocurrency "wallet" is created and associated with his account, and funds each of the wallets with cryptocurrency. The wallets require that each transaction is doubly signed by both the user and the payment platform, such that the funds can only be distributed from a wallet via a blockchain transaction that is signed by the private keys of both the user and the payment platform. This dual-signing approach provides assurance to the payment platform that no expenditure of the deposited cryptocurrency can take place without their participation, and hence no attempt can be made to "double-spend" the deposited cryptocurrency.

As a result of the double-signing requirement, the cryptocurrency that funds the wallets of the user's account is subject to the "joint custody" of the user and the payment platform, according to the "two-of-two" multi-signature requirement for distribution. In embodiments, the payment platform account is subject to a contract between the user and the payment platform specifying terms that guarantee return to the user of sole control over the cryptocurrency that is stored in the account in the case of any dispute between the parties, or failure to perform on the part of the payment platform.

When making a purchase, the user presents to a merchant a payment number that was issued to the user by the payment platform. In embodiments, the payment number functions as a placebo debit card number, in that it can be entered by a merchant into traditional POS equipment that is configured to accept debit card information, or processed by a website that is configured to accept debit card numbers as payment.

In embodiments, immediately or shortly before making the purchase, the user transmits a request for an authorization code to the payment platform using the cryptocurrency payment app that is running on the user's mobile device, and in response the payment platform transmits a single-use payment number to the app which can be displayed on the mobile device, for example as a barcode, "QR" code, or other visible image to be scanned. In some of these embodiments, the payment number is only valid for a limited time period. If the merchant POS apparatus is not equipped to scan the image, the merchant can manually enter the payment number into the POS apparatus. Similarly, in embodiments the user can enter the payment number into a website as part of an online purchase.

In other embodiments, the payment number is a static digit string that is recorded on a physical card that functions as a "placebo" debit card. As with an actual debit card, the static digital string can be physically stamped on the card, magnetically recorded on the card, and/or electronically recorded in a "chip" included in the card. When entered into the POS apparatus, the static digital string is used for routing the transaction from the POS apparatus to the payment platform for authorization.

Once the payment number or placebo debit card has been presented to the merchant and entered into the POS apparatus, the POS apparatus transmits a payment request, together with details describing the requested transaction to the payment platform via a conventional fiat currency payment network. The transaction details include merchant identification, the payment number, the item to be purchased, and the fiat currency amount to be paid to the merchant.

Having received the payment request, the payment platform proceeds to determine whether the user's account contains sufficient cryptocurrency to complete the transaction. If not, then the payment request from the merchant is declined. If so, then the payment platform wirelessly transmits, to the user's mobile device, payment information that includes an amount of cryptocurrency that is needed to complete the transaction, including any applicable user fees, and the applicable exchange rate for the cryptocurrency. The payment information is presented to the user by the mobile device, and based on the payment information the user either approves or disapproves the purchase. If the purchase is disapproved by the user, then the payment platform declines the payment request from the merchant. If the purchase is approved by the user, then the payment platform accepts the payment request from the merchant, and initiates a merchant settlement transaction, either directly with the merchant or via a payment network partner, whereby fiat currency is transmitted to the merchant in the amount of the purchase.

In similar embodiments, the user is able to preauthorize expenditure of cryptocurrency, for example using a mobile app running on a handheld device or using a computer via the internet, either in a specific amount for a specific purchase, or as a maximum amount, with the specific purchase vendor and price to be determined later. The preauthorization can be for a limited period of time and/or limited to a specific merchant and/or type of merchandise. At the time of purchase, the user can present a payment number to a merchant, for example using a scannable QR code or a placebo debit card, which is processed as described above, except that approval by the user at the point of sale is not required due to the preauthorization by the user. According to this approach, use of the mobile device at the point of sale is not necessarily required, for example if the payment number is presented to the merchant in the form of a placebo debit card.

Accordingly, from the merchant's point of view, in embodiments the purchase transaction is similar or identical to a conventional fiat currency transaction, in that the merchant processes the payment request using conventional POS apparatus and/or software, which transmits the payment request including purchase information via a conventional payment network or via the internet to the payment platform, either directly or through a partner of the payment platform.

It is notable that, in embodiments, the payment number functions only as a routing number that is used to connect the merchant's POS apparatus to the payment platform. As such, the payment number cannot be used to misappropriate cryptocurrency funds, for example if a payment code used for an online transaction is stolen as part of a cyber intrusion of the online vendor, because completion of any purchase requires transmittal of all relevant purchase information by the payment platform to the user's mobile device and authorization of each purchase by the user. Accordingly, while the present invention enables a user to make cryptocurrency-funded purchases in the same manner as when using fiat-currency, embodiments of the present invention nevertheless offer considerably higher security against fraud as compared, for example, to a conventional debit or credit card.

As the user's payment platform account is used to make purchases, instead of initiating a separate blockchain transaction corresponding to each of the purchases, the payment platform aggregates a plurality of purchases, and then initiates a single blockchain transaction in an amount that is sufficient to fund all of the purchases, thereby minimizing the blockchain transaction fees that are incurred. In various embodiments, the period of aggregation can be a fraction of a day, an entire day, a week, a month, or even longer. In embodiments, transactions made by a plurality of users are aggregated and converted to fiat currency in a single blockchain conversion, thereby further reducing blockchain conversion fees.

According to this approach, each time the user makes a purchase, the user submits a user-signed blockchain transaction to the payment platform authorizing withdrawal from the user's account of sufficient cryptocurrency to fund all of the user's transactions that have been made since the most recent, previous aggregate blockchain conversion. As the aggregation process continues, each time a new user-signed transaction is received, the payment platform archives or discards any previously received, unused user-signed transactions in favor of the new one.

Once the aggregation process is completed, the most recent user-signed transaction is signed by the payment platform and submitted to the blockchain for withdrawal of cryptocurrency from the user's account and conversion into fiat currency.

In some embodiments, the payment platform maintains a "buffer" fund of fiat currency that enables the payment platform to extend the aggregation period while timely remitting transaction amounts to merchants upon verification of purchase transactions, after which the payment platform subsequently executes a blockchain conversion to replenish the buffer fund.

In some embodiments, when a new cryptocurrency wallet is opened for a user, the payment platform issues an address to the user for the new wallet, but does not initially deploy a new smart contract. Instead, the actual deploying of the smart contract is delayed until after a first purchase has been made using the issued address, and after any subsequent aggregation period has been completed. In this way, the fees and any other expenses that are required to deploy a new smart contract are not incurred until they are actually needed. And in the case that a user determines that a wallet will not be needed, without having ever used the wallet, then the cost of deploying a new smart contract is avoided.

In various embodiments, if a user wishes to obtain a wallet for the purpose of holding a first type of cryptocurrency, for which the creation and/or maintenance of such a wallet requires an expenditure of a second type of cryptocurrency for the payment of fees, the payment platform is able to create the wallet for the first type of cryptocurrency without requiring that the user open and fund a wallet directed to the second type of cryptocurrency. For example, creation for a user of a wallet containing U.S. Dollar Coin (USDC) cryptocurrency will typically require use of the Ethereum blockchain, for which the transaction fees must be paid in Ether. However, embodiments of the present invention are able to use an Ethereum wallet maintained by the payment platform to make Ether payments on behalf of the user. The fees for creating the USDC wallets can then be assessed against the user in USDC currency, or in any other denomination, including fiat currency.

In embodiments, the cryptocurrency amount that is included in each user-signed transaction is calculated according to the cryptocurrency exchange rates that were applicable at the time each of the purchases was made. As such, the payment platform accepts any benefit or loss that may ensue due to fluctuations in the cryptocurrency exchange rate during the aggregation period. Accordingly, in some embodiments, the payment platform is able to time the eventual blockchain conversion, and delay it as necessary, so as to take advantage of any fluctuations in the exchange rate of the cryptocurrency.

Aggregation of cryptocurrency transactions further enables the payment platform to accept corrections and reversals of transactions if they are made before the aggregated blockchain conversion is executed. Accordingly, in embodiments the payment platform guarantees that the blockchain conversion will be delayed by at least a specified interval, such as an hour, so as to allow correction of mistakes etc. without incurring blockchain fees. In some of these embodiments a reversal of a transaction does not require any additional authorization or interaction by the user, since the payment platform can simply revert to the most recent, previously submitted user-signed transaction. In other embodiments, reversal of a transaction requires authorization by the user, such that a new user-signed blockchain transaction is provided to the payment platform specifying the corrected amount of cryptocurrency to be withdrawn from the wallet and used for the next blockchain conversion.

Embodiments further establish reserve funds of cryptocurrency, which can be liquidated to offset a shortfall when the exchange rate for the cryptocurrency falls between the time of purchase and the eventual time when the blockchain conversion occurs. In similar embodiments, the payment platform can choose to sell cryptocurrency from the reserve fund in an amount that provides sufficient fiat currency to satisfy point-of-sale (POS) transaction requirements, after which user's authorized withdrawals from the wallet can be executed and used for blockchain conversion of funds at a later time, when the exchange rate has recovered and the user's authorized transaction amount will yield sufficient fiat currency to replenish the buffer fund. In some of these embodiments, usage fees that are charged to the user are paid by the user in cryptocurrency, which is used to fund or supplement the reserve cryptocurrency fund.

A first general aspect of the present invention is a method of using cryptocurrency to complete a fiat currency purchase from a merchant. The method includes the following steps:

A) depositing by a user of cryptocurrency into a cryptocurrency account from which withdrawal of the cryptocurrency requires submission of a blockchain transaction that is signed by both the user and by a payment platform;

B) issuing by the payment platform of a payment number to the user, said payment number being compatible for input into fiat currency point of sale (POS) payment processing systems;

C) upon initiation of the fiat currency purchase from a merchant by the user, inputting of the payment number into a POS apparatus of the merchant;

D) transmitting by the POS apparatus of a payment request to the payment platform, said payment request including a fiat currency purchase price;

E) if a cryptocurrency balance of the cryptocurrency account is sufficient to fund the fiat currency purchase price at a current cryptocurrency exchange rate, transmitting by the payment platform of payment information to the user, said payment information including an equivalent cryptocurrency purchase amount;

F) transmitting by the user to the payment platform of a payment approval and a user-signed transaction, said user-signed transaction authorizing transfer to the payment platform from the user's cryptocurrency account of cryptocurrency in an aggregate amount equal to a sum of the equivalent cryptocurrency purchase amount and any previous cryptocurrency purchase amounts applicable to previous purchases made by the user since a most recent blockchain conversion was executed by the payment platform;

G) transmitting by the payment platform of fiat currency in an amount equal to the fiat currency purchase price to the merchant by the payment platform;

H) deducting of the equivalent cryptocurrency purchase amount from the cryptocurrency balance of the cryptocurrency account; and I) during a purchase aggregation period, repeating steps C) through H) each time a fiat currency purchase is initiated by the user; and J) upon expiration of the purchase aggregation period, executing by the payment platform of a most recent of the user-signed transactions received from the user, thereby initiating a blockchain conversion.

In embodiments, step B) includes sending by the user of a request for the payment number to the payment platform via a mobile device that is possessed by the user, and transmission of the payment number by the payment platform to the mobile device. In some of these embodiments the payment number is valid only for transaction of a single purchase.

In any of the above embodiments, the payment number can be valid only for a designated time period after it is issued.

In any of the above embodiments, step B) can include issuing by the payment platform to the user of a physical placebo card having the payment number recorded as a static string thereupon.

In any of the above embodiments, in step E) the payment information can include the current cryptocurrency exchange rate In any of the above embodiments, step A) can include depositing by the user of a plurality of types of cryptocurrency into a corresponding plurality of cryptocurrency accounts, and wherein the payment number issued to the user by the payment platform in step B) is directed to a selected one or more of the cryptocurrency accounts. In some of these embodiments, in step E), if the cryptocurrency balance of the cryptocurrency account to which the payment number is directed is not sufficient to fund the fiat currency purchase price, the payment information transmitted by the payment platform to the user includes proposed amounts of cryptocurrency to be withdrawn from a plurality of the cryptocurrency accounts to fund the fiat currency purchase price.

In any of the above embodiments, the method can further include, after step I) and before a first execution of step J), deploying a new smart contract associated with the cryptocurrency account.

A second general aspect of the present invention is a method of using cryptocurrency to complete a fiat currency purchase from a merchant. The method includes the following steps:

A) depositing by a user of cryptocurrency into a cryptocurrency account from which withdrawal the cryptocurrency requires submission of a blockchain transaction that is signed by both the user and by a payment platform;

B) issuing by the payment platform of a payment number to the user, said payment number being compatible for input into fiat currency point of sale (POS) payment processing systems;

C) transmitting by the user to the payment platform of a preauthorization request including a user-signed transaction, said user-signed transaction authorizing transfer to the payment platform from the user's cryptocurrency account of cryptocurrency in an aggregate amount equal to a sum of a cryptocurrency preauthorization amount and any previous cryptocurrency purchase amounts applicable to previous purchases made by the user since a most recent blockchain conversion was executed by the payment platform;

D) if a cryptocurrency balance of the cryptocurrency account is greater than the cryptocurrency preauthorization amount, subtracting by the payment platform of the cryptocurrency preauthorization amount from the cryptocurrency balance and transmitting by the payment platform to the user of a preauthorization approval;

E) upon initiation of the fiat currency purchase from a merchant by the user, inputting of the payment number into a POS apparatus of the merchant;

F) transmitting by the POS apparatus of a payment request to the payment platform, said payment request including a fiat currency purchase price;

G) determining by the payment platform of a cryptocurrency price equivalent of the fiat currency purchase price according to a current cryptocurrency exchange rate;

H) If the cryptocurrency price equivalent is less than or equal to the preauthorization amount, transmitting by the payment platform of fiat currency in an amount equal to the fiat currency purchase price to the merchant;

I) if the cryptocurrency price equivalent is less than the preauthorization amount, sending by the payment platform of a request for a revised user-signed transaction authorizing transfer to the payment platform from the user's cryptocurrency account of cryptocurrency in an aggregate amount equal to a sum of the cryptocurrency price equivalent and the previous cryptocurrency purchase amounts applicable to previous purchases made by the user since the most recent blockchain conversion was executed by the payment platform;

J) upon receipt of the revised user-signed transaction, adding to the cryptocurrency balance by the payment platform of an amount equal to the difference between the preauthorization amount and the cryptocurrency price equivalent;

K) during a purchase aggregation period, if and each time a fiat currency purchase is initiated by the user, repeating steps C) through J); and L) upon expiration of the purchase aggregation period, executing by the payment platform of a most recent of the user-signed transactions received from the user, thereby initiating a blockchain conversion.

In embodiments, step C) can include sending by the user of the preauthorization request via a user mobile device.

In any of the above embodiments, step B) can include issuing by the payment platform to the user of a physical placebo card having the payment number recorded thereupon as a static string.

In any of the above embodiments, the preauthorization approval can be valid only for transaction of a single purchase.

In any of the above embodiments, the preauthorization approval can be valid only for a designated time period after it is issued.

In any of the above embodiments, step A) can include depositing by the user of a plurality of types of cryptocurrency into a corresponding plurality of cryptocurrency accounts, and the payment number issued to the user by the payment platform in step B) can be directed to a selected one or more of the cryptocurrency accounts.

In any of the above embodiments, the previous cryptocurrency purchase amounts can be determined according to cryptocurrency conversion rates that were applicable when corresponding previous purchases were transacted.

Any of the above embodiments can include, during the aggregation period, accepting a reversal of a fiat currency purchase made by the user since the most recent blockchain conversion.

In any of the above embodiments, the blockchain conversion can include executing of a plurality of user-signed transactions received from a plurality of users.

In any of the above embodiments, the aggregation period can be a fixed period of time.

In any of the above embodiments, the aggregation period can be terminated when the aggregate amount exceeds a specified maximum.

In any of the above embodiments, the fiat currency transmitted by the payment platform to the merchant can be withdrawn from a fiat currency buffer account maintained by the payment platform, and the aggregation period can be terminated when a balance of the fiat currency buffer account falls below a specified minimum.

In any of the above embodiments, the aggregation period can be terminated by the payment platform according to a decision made by the payment platform in view of fluctuations in the cryptocurrency exchange rate.

Any of the above embodiments can further include maintaining by the payment platform of a cryptocurrency reserve fund; and if executing the most recent user-signed transaction does not yield sufficient fiat currency to replenish a total of the fiat currency payments made to merchants since the most recent blockchain transaction, including cryptocurrency from the reserve fund in the blockchain transaction.

Any of the above embodiments can further include collecting fees from the user, said fees being denominated in cryptocurrency and deposited in the reserve account.

And in any of the above embodiments, the method can further include, after step K) and before a first execution of step L), deploying a new smart contract associated with the cryptocurrency account.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a method for enabling cryptocurrencies to be readily and conveniently used for conventional purchases, including in-person point of sale purchases using conventional POS apparatus, without encountering blockchain transaction delays, without each transaction being subject to a blockchain transaction fee, and without necessarily incurring additional fees when a transaction is changed or reversed.

According to the present method, cryptocurrency purchases are mediated by a payment platform. A user creates an account with the payment platform that is linked to a cryptocurrency payment application ("app") running on a wireless mobile device possessed by the user. In embodiments, the wireless mobile device is a smartphone. The user then creates at least one cryptocurrency "wallet" associated with his account, and funds each of the wallets with cryptocurrency. Each of the wallets is doubly signed by both the user and the payment platform, such that the funds can only be distributed from a wallet via a blockchain transaction that is signed by the private keys of both the user and the payment platform. This dual-signing approach provides assurance to the payment platform that no expenditure of the deposited cryptocurrency can take place without their participation, and hence no attempt can be made to "double-spend" the deposited cryptocurrency.

As a result of the double-signing requirement, the cryptocurrency that funds the user's account is subject to the "joint custody" of the user and the payment platform, according to the "two-of-two" multi-signature requirement for distribution. In embodiments, the payment platform account is subject to a contract between the user and the payment platform specifying terms that guarantee return to the user of sole control over the cryptocurrency in the account in the case of any dispute between the parties, or failure to perform on the part of the payment platform.

Figure 1A:
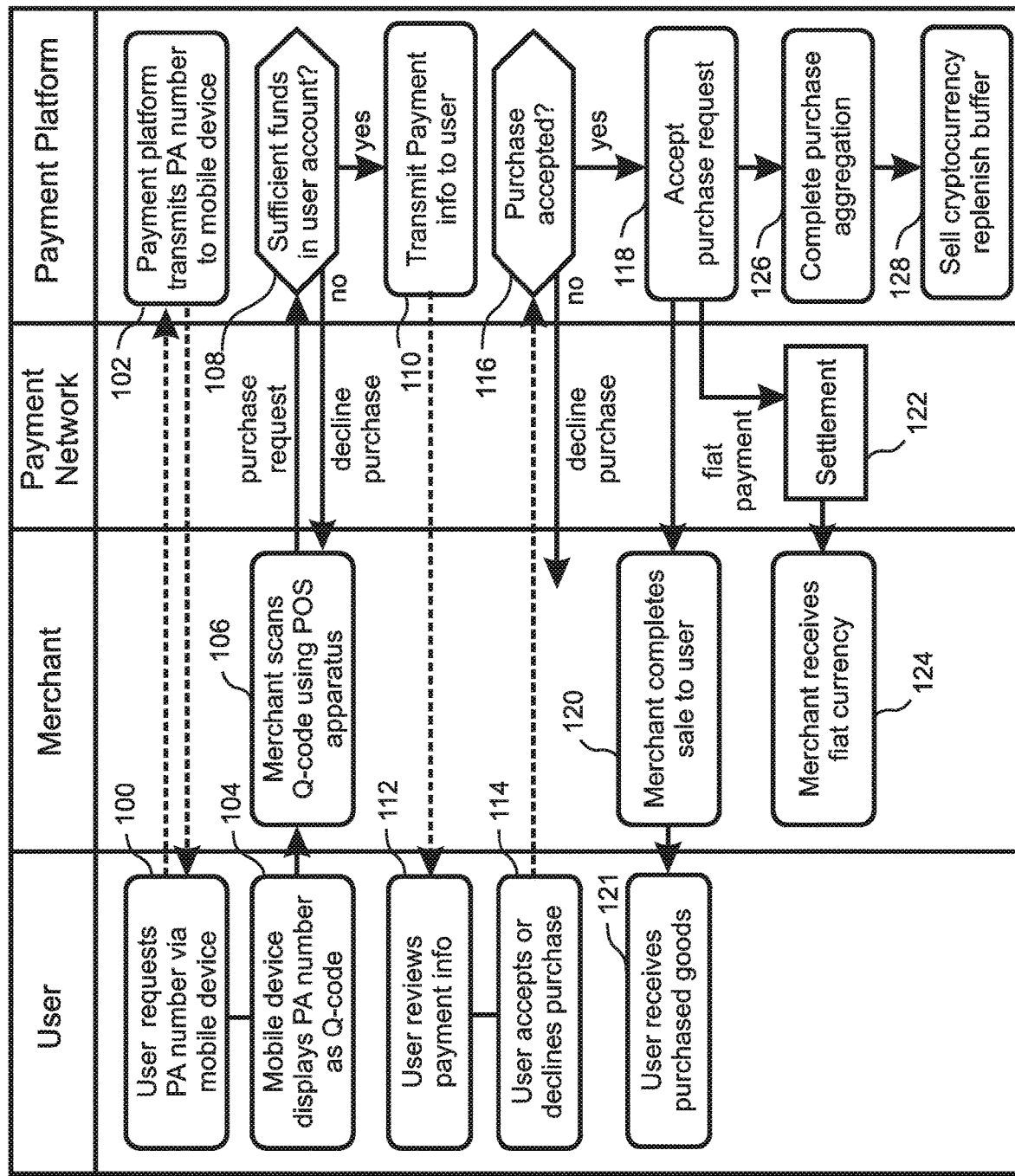
FIG. 1A is a flow diagram that illustrates an embodiment of the present invention wherein a QR-code displayed on a wireless mobile device enables the use of cryptocurrency to make a purchase from a merchant at a point-of-sale.

With reference to FIG. 1A, when making a purchase, the user presents to a merchant a payment number that was issued to the user by the payment platform. In embodiments, immediately or shortly before making the purchase, the user transmits a request 100 for a payment number (PA number) to the payment platform using the cryptocurrency payment app that is running on the user's mobile device, and in response the payment platform transmits 102 a single-use PA number to the app which can be displayed on the mobile device 104 as the payment number, for example as a barcode, "QR" code, or other visible image to be scanned. In some of these embodiments, the PA number is only valid for a limited time period. The merchant proceeds to scan the visible image 106, or if the merchant POS apparatus is not equipped to scan the image, the merchant can manually enter the payment number into the POS apparatus. Similarly, in embodiments the user can enter the payment number into a website as part of an online purchase.

In other embodiments, the payment number is a static digital string that is recorded on a physical card that functions as a "placebo" debit card. As with an actual debit card, the static digital string can be physically stamped on the card, magnetically recorded on the card, and/or electronically recorded in a "chip" included in the card. When entered into the POS apparatus, the static digital string is used for routing the transaction from the POS apparatus to the payment platform for authorization.

Once the PA number has been presented to the merchant and entered into the POS apparatus 106, the POS apparatus transmits a payment request, together with details describing the requested transaction, to the payment platform via a conventional fiat currency payment network. The transaction details include merchant identification, the payment authorization code, the item to be purchased, and the fiat currency amount to be paid to the merchant.

Having received the payment request, the payment platform proceeds to determine whether the user's account contains sufficient cryptocurrency to complete the transaction 108. If not, then the payment request from the merchant is declined. If so, then the payment platform wirelessly transmits 110 to the user's mobile device payment information that includes an amount of cryptocurrency that is needed to complete the transaction, including any applicable user fees, and the applicable exchange rate for the cryptocurrency. The payment information is presented to the user by the mobile device 112, and based on the payment information the user either approves or disapproves the purchase 114. If the purchase is disapproved by the user, then the payment platform declines the payment request from the merchant. If the purchase is approved by the user 116, then the payment platform accepts the payment request from the merchant 118, the merchant completes the sale to the user 120, and the user receives the purchased goods and/or services 121. Meanwhile, the payment platform initiates a merchant settlement transaction 122, either directly with the merchant or via a payment network partner, whereby fiat currency is transmitted to the merchant in the amount of the purchase 124.

Figure 1B:
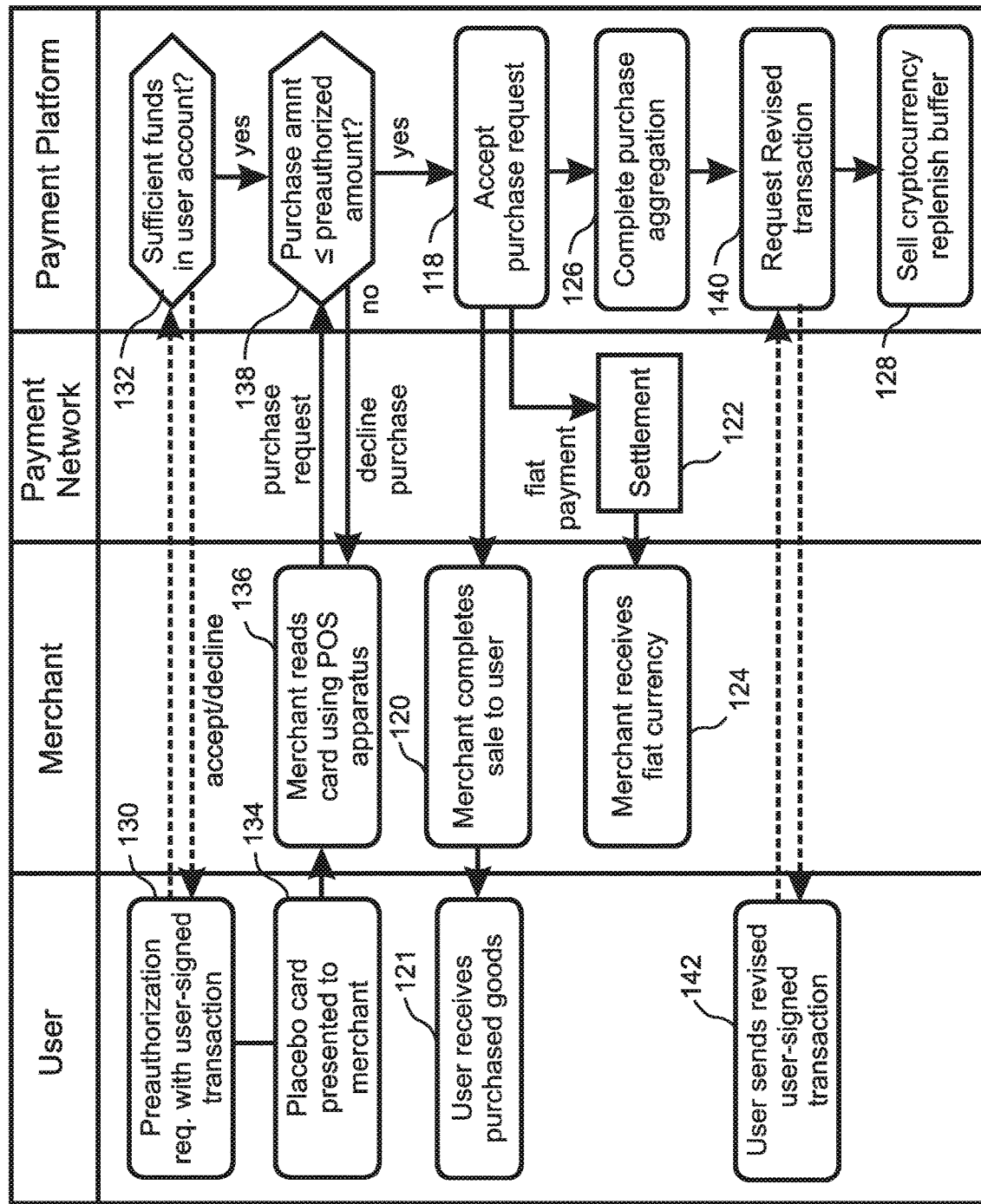
FIG. 1B is a flow diagram that illustrates an embodiment of the present invention wherein a placebo debit card enables the use of cryptocurrency to make a purchase from a merchant at a point-of-sale.

With reference to FIG. 1B, in similar embodiments the user is able to preauthorize expenditure of cryptocurrency 130 by sending a preauthorization user-signed transaction to the payment platform in a cryptocurrency preauthorization amount, for example using a computer via the internet, either in a specific amount for a specific purchase, or as a maximum amount, with the specific purchase vendor and price to be determined later. The preauthorization can be for a limited period of time and/or limited to a specific merchant and/or type of merchandise.

Upon receipt of the preauthorization request, the payment platform determines whether sufficient funds are available in the user's account 132, and if so, then the requested amount is withdrawn from the user's account and set aside in anticipation of the preauthorized purchase.

At the time of purchase, instead of requiring that a QR-code or other transitory indicia be scanned by the POS apparatus, the user can simply present the placebo debit card to the merchant 134, which is processed by the POS apparatus as if it were a conventional debit or credit card 136 and used to route a purchase request including a fiat currency purchase price to the payment platform.

Upon receipt of the purchase request, the payment platform determines 138 if the preauthorized cryptocurrency amount is sufficient to fund the purchase price according to a current cryptocurrency exchange rate. If so, then the purchase is completed as described above. If the amount of cryptocurrency required to fund the purchase price is less than the preauthorized cryptocurrency amount, then the payment platform sends a request 140 to the user for a revised user-signed transaction that reflects the actual expenditure of cryptocurrency rather than the preauthorized amount.

At a later point in time, for example when the user has returned to his/her computer, the user sends the revised user-signed transaction to the payment platform 142, which then replaces the earlier preauthorization user-signed transaction.

It is notable that in embodiments, according to this approach, use of a mobile device at the point of sale is not required, because the purchase amount has already been pre-authorized before the user arrives at the point of sale.

Accordingly, from the merchant's point of view, in embodiments the purchase transaction is similar or identical to a conventional fiat currency transaction, in that the merchant processes the payment request using conventional POS apparatus and/or software, which transmits the payment request including purchase information via a conventional payment network or via the internet to the payment platform, either directly or through a partner of the payment platform.

It is notable that the payment number, or the static string recorded on the placebo debit card, functions only as a routing number that is used to connect the merchant's POS apparatus to the payment platform. As such, the payment number cannot be used to misappropriate cryptocurrency funds, for example if a payment code used for an online transaction is stolen as part of a cyber intrusion of the online vendor, because completion of any purchase requires transmittal of all relevant purchase information by the payment platform to the user's mobile device and authorization of each purchase by the user. Accordingly, while the present invention enables a user to make cryptocurrency-funded purchases in the same manner as when using fiat-currency, the present invention nevertheless offers considerably higher security against fraud as compared, for example, to a conventional credit card.

As the user's payment platform account is used to make purchases, instead of initiating a separate blockchain transaction corresponding to each of the purchases, the payment platform aggregates a plurality of purchases 126, and then initiates a single blockchain transaction in an amount that is sufficient to fund all of the purchases 128, thereby minimizing the blockchain transaction fees that are incurred. In various embodiments, the period of aggregation can be a fraction of a day, an entire day, a week, a month, or even longer. In embodiments, transactions made by a plurality of users are aggregated and converted to fiat currency in a single blockchain conversion, thereby further reducing blockchain conversion fees.

In various embodiments, the payment platform instead maintains a "buffer" fund of fiat currency that is used to timely remit transaction amounts to merchants 122 upon verification of purchase transactions 118, thereby allowing the payment platform to subsequently execute the blockchain conversion 128 and replenish the buffer fund at a later time that is deemed more appropriate.

Figure 2:
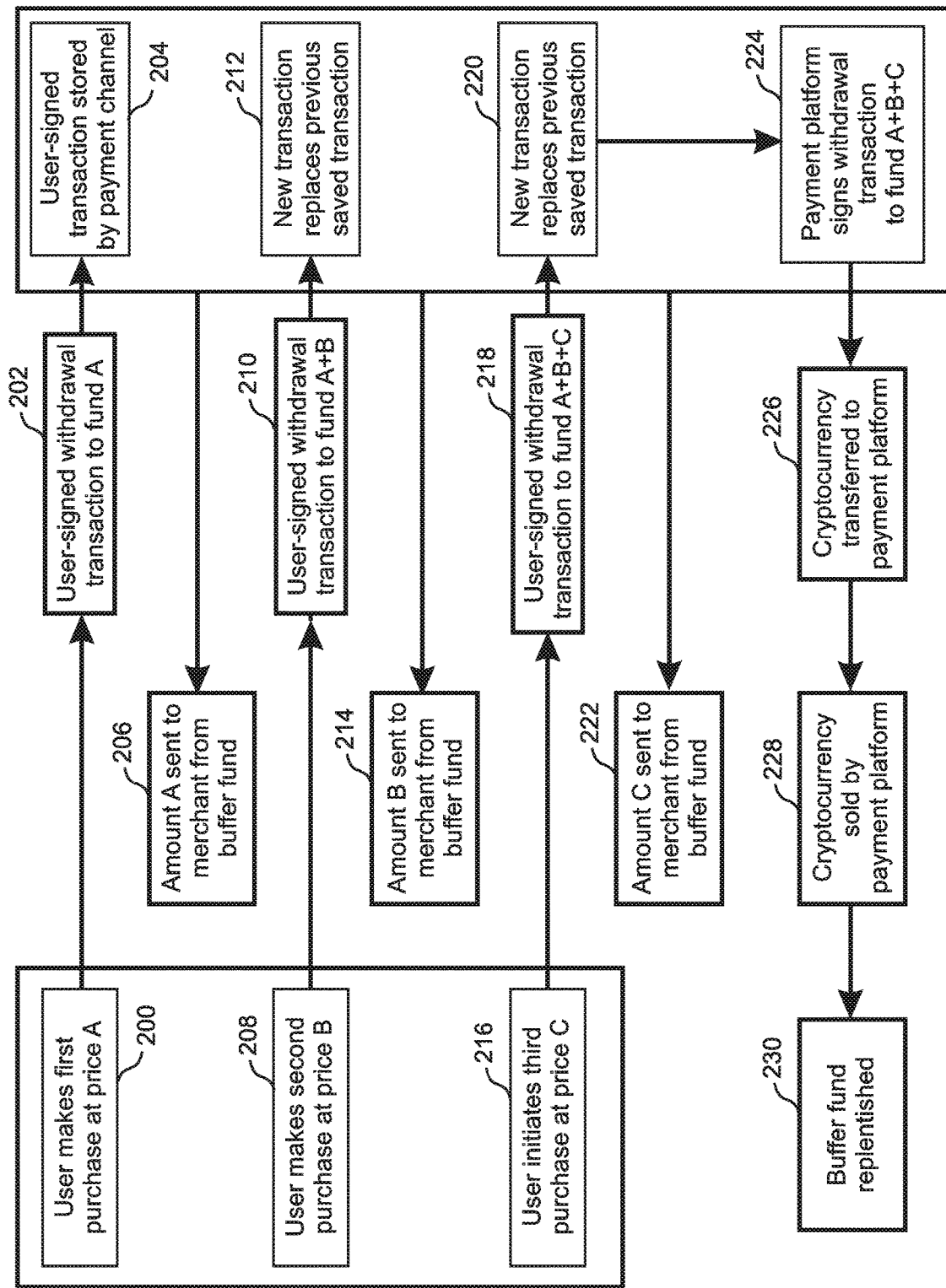
FIG. 2 is a flow diagram that illustrates aggregation in an embodiment of a plurality of user transactions before executing a blockchain conversion to replenish a fiat currency buffer fund

FIG. 2 illustrates an example of the interaction between the user and the payment platform in an embodiment as the user makes multiple retail purchases using cryptocurrency. According to the illustrated example, when the user accepts the purchase details and authorizes payment of the merchant 114 for a first purchase 200, in addition to the request for a payment authorization code 100 and other steps described above with reference to FIG. 1, the user transmits to the payment platform a user-signed blockchain transaction 202 specifying a transfer of cryptocurrency from the user's cryptocurrency account to the payment platform in an amount that would be sufficient to cover the purchase price "A" of the first purchase. Instead of immediately signing and executing the user-signed transaction, the payment platform stores the user-signed transaction 204 and sends an amount "A" of fiat currency to the merchant from the buffer fund 206.

Subsequently, the user makes a second purchase 208. Knowing that the previous user-signed blockchain transaction 202 has not yet been executed, the user transmits to the payment platform a replacement user-signed blockchain transaction 210 specifying a transfer of cryptocurrency from the user's account to the payment platform in an amount that would be sufficient to cover the both of the purchase prices A+B. Upon receipt of the new blockchain transaction, the payment platform discards or archives the previously received transaction and replaces it with the new one 212, and sends an amount "B" of fiat currency to the merchant (which may not be the same merchant as for the previous purchase) from the buffer fund 214. Note that archiving of earlier user-signed blockchain transactions can be useful in the event that a purchase is reversed, for example if the user decides to return the purchased item for a full refund.

Sometime later, the user makes a third purchase 216, and transmits to the payment platform a replacement user-signed blockchain transaction 218 specifying a transfer of cryptocurrency from the user's account to the payment platform in an amount that would be sufficient to cover the all three of the purchase prices A+B+C. Upon receipt of the new blockchain transaction, the payment platform discards or archives the previously received user-signed transaction, replaces it with the new one 220, and sends an amount "C" of fiat currency to the merchant from the buffer fund 222.

At some point, it is determined that a blockchain conversion should be executed so as to cover the aggregated purchases by the user. Depending on the embodiment, this may be due to the elapsing of a specified period of time, which can be a fraction of a day, an entire day, a week, a month, or even longer. Or it may be due to the buffer fund falling below a specified minimum funding level. Or it may be a decision that is timed by the payment platform so as to take advantage of favorable fluctuations in the exchange rate of the cryptocurrency. At this point, the payment platform signs the most recent blockchain transation 224, which has already been signed by the user, and uses the doubly-signed transaction to initiate a single "lump sum" blockchain conversion 226, whereby sufficient cryptocurrency to cover all three of the purchases A, B, and C is transferred from the user's cryptocurrency account to the payment platform, and then is sold 228 so that the buffer fund can be replenished 230. This approach avoids the excess blockchain fees that would arise from multiple blockchain transactions instead of a single aggregated blockchain transaction.

In some of these embodiments, each time the user makes a purchase 200, 208, 216, a "locked-in" cryptocurrency exchange rate is assigned to the purchase, whereby the user is insulated from any subsequent fluctuations in the exchange rate, blockchain conversion fees, etc. According to this approach, the payment platform assumes any gain or loss resulting from such fluctuations between the time the purchase is made and the time that the subsequent blockchain conversion occurs.

In embodiments, transactions made by a plurality of users are aggregated and converted to fiat currency in a single blockchain conversion, thereby further reducing blockchain conversion fees.

In various embodiments the payment platform is able to accept corrections and reversals of transactions without imposing significant fees if the corrections or reversals are made before the associated blockchain conversion 224 is executed. In some of these embodiments a reversal of a transaction does not require any additional authorization or interaction by the user. Instead, the most recent user-signed transaction can be discarded and a previously received user-signed transaction can be retrieved from an archive and reinstated. In other embodiments, reversal or correction of a transaction requires authorization by the user so that a user-signed blockchain transaction is provided to the payment platform specifying the corrected amount of cryptocurrency to be withdrawn from the wallet and used for the next blockchain conversion.

Embodiments further establish reserve funds of cryptocurrency, which can be liquidated to offset a shortfall when the exchange rate for the cryptocurrency falls between the time of purchase and the eventual time when the blockchain conversion occurs. In similar embodiments, the payment platform can choose to sell cryptocurrency from the reserve fund in an amount that provides sufficient fiat currency to satisfy point-of-sale (POS) transaction requirements, after which user's authorized withdrawals from the wallet can be executed and used for blockchain conversion of funds at a later time, when the exchange rate has recovered and the user's authorized transaction amount will yield sufficient fiat currency to replenish the buffer fund. In some of these embodiments, usage fees that are charged to the user are paid by the user in cryptocurrency, which is used to fund or supplement the reserve cryptocurrency fund.

In some embodiments, when a new cryptocurrency wallet is opened for a user, the payment platform issues an address to the user for the new wallet, but does not initially deploy a new smart contract. Instead, the actual deploying of the smart contract is delayed until after a first purchase has been made using the issued address, and after any subsequent aggregation period has been completed. In this way, the fees and any other expenses that are required to deploy a new smart contract are not incurred until they are actually needed. And in the case that a user determines that a wallet will not be needed, without having ever used the wallet, then the cost of deploying a new smart contract is avoided.

In various embodiments, if a user wishes to obtain a wallet for the purpose of holding a first type of cryptocurrency, for which the creation and/or maintenance of such a wallet requires an expenditure of a second type of cryptocurrency for the payment of fees, the payment platform is able to create the wallet for the first type of cryptocurrency without requiring that the user open and fund a wallet directed to the second type of cryptocurrency. For example, creation for a user of a wallet containing U.S. Dollar Coin (USDC) cryptocurrency will typically require use of the Ethereum blockchain, for which the transaction fees must be paid in Ether. However, embodiments of the present invention are able to use an Ethereum wallet maintained by the payment platform to make Ether payments on behalf of the user. The fees for creating the USDC wallets can then be assessed against the user in USDC currency, or in any other denomination, including fiat currency.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A method, operable by a payment platform, of using cryptocurrency to complete a fiat currency purchase from a merchant, the method comprising:
   A) receiving by the payment platform of cryptocurrency deposited by a user into a cryptocurrency account from which withdrawal of the cryptocurrency requires submission of a blockchain transaction that is signed by both the user and by the payment platform;
   B) issuing by the payment platform of a payment number to the user, said payment number being compatible for input into fiat currency point of sale (POS) payment processing systems;
   C) upon initiation of the fiat currency purchase from the merchant by the user, receiving by the payment platform of a payment request communicated from a POS apparatus of the merchant, said payment request including a fiat currency purchase price;
   D) if a cryptocurrency balance of the cryptocurrency account is sufficient to fund the fiat currency purchase price at a current cryptocurrency exchange rate, transmitting by the payment platform of payment information to the user, said payment information including an equivalent cryptocurrency purchase amount;

E) receiving by the payment platform of a user-signed blockchain transaction signed by the user, said user-signed blockchain transaction authorizing transfer to the payment platform from the user's cryptocurrency account of cryptocurrency in an aggregate amount equal to a sum of the equivalent cryptocurrency purchase amount and any previous cryptocurrency purchase amounts applicable to previous purchases made by the user since a most recent blockchain conversion was executed by the payment platform;

F) transmitting by the payment platform of fiat currency in an amount equal to the fiat currency purchase price to the merchant;

G) deducting by the payment platform of the equivalent cryptocurrency purchase amount from the cryptocurrency balance of the cryptocurrency account;

H) during a purchase aggregation period, repeating steps C) through G) each time a fiat currency purchase is initiated by the user;

I) terminating the purchase aggregation period by the payment platform when a balance of the fiat currency buffer account falls below a specified minimum or based on fluctuations in the cryptocurrency exchange rate;

J) upon terminating the purchase aggregation period, executing by the payment platform of a most recent of the user-signed transactions received from the user, thereby initiating a blockchain conversion to transfer the equivalent cryptocurrency amount from the cryptocurrency account of the user to the payment platform; and K) maintaining by the payment platform of a cryptocurrency reserve fund, and if executing the most recent user-signed transaction does not yield sufficient fiat currency to replenish a total of the fiat currency payments made to merchants since the most recent blockchain transaction, including cryptocurrency from the reserve fund in the blockchain transaction.

2. The method of claim 1, wherein step B) includes receiving by the payment platform of a request for the payment number via a mobile device that is possessed by the user, and transmission of the payment number by the payment platform to the mobile device.

3. The method of claim 1, wherein the payment number is valid only for transaction of a single purchase.

4. The method of claim 1, wherein the payment number is valid only for a designated time period after it is issued.

5. The method of claim 1, wherein step B) includes issuing by the payment platform to the user of a physical placebo card having the payment number recorded as a static string thereupon.

6. The method of claim 1, wherein step A) includes depositing by the user of a plurality of types of cryptocurrency into a corresponding plurality of cryptocurrency accounts, and wherein the payment number issued to the user by the payment platform in step B) is directed to a selected one or more of the cryptocurrency accounts.

7. The method of claim 6, wherein in step D), if the cryptocurrency balance of the cryptocurrency account to which the payment number is directed is not sufficient to fund the fiat currency purchase price, the payment information transmitted by the payment platform to the user includes proposed amounts of cryptocurrency to be withdrawn from a plurality of the cryptocurrency accounts to fund the fiat currency purchase price.

8. The method of claim 1, wherein the method further includes, after step G) and before a first execution of step H), deploying a new smart contract associated with the cryptocurrency account.

9. The method of claim 1, wherein in step F), the fiat currency transmitted by the payment platform to the merchant is withdrawn from a fiat currency buffer account.

10. The method of claim 1, further comprising collecting fees from the user, said fees being denominated in cryptocurrency and deposited in the reserve account.

* * * * *